(12) United States Patent
Chen et al.

(10) Patent No.: US 11,346,389 B2
(45) Date of Patent: May 31, 2022

(54) ROTARY CLOSED-VALVE VACUUM SUCTION DEVICE

(71) Applicant: NINE THREE INTERNATIONAL CO., LTD., Tainan (TW)

(72) Inventors: Kuo-Chang Chen, Tainan (TW);
Hsin-Huang Tsai, Tainan (TW);
Chun-Yen Tsao, Tainan (TW)

(73) Assignee: NINE THREE INTERNATIONAL CO., LTD., Tainan (TW)

( * ) Notice: Subject to any disclaimer, the term of this patent is extended or adjusted under 35 U.S.C. 154(b) by 0 days.

(21) Appl. No.: 17/361,844

(22) Filed: Jun. 29, 2021

(65) Prior Publication Data

US 2021/0404510 A1 Dec. 30, 2021

(30) Foreign Application Priority Data

Jun. 30, 2020 (TW) ................... 109208302

(51) Int. Cl.
*F16B 47/00* (2006.01)
*A47G 19/10* (2006.01)
*A47G 29/093* (2006.01)
*F16M 13/00* (2006.01)

(52) U.S. Cl.
CPC .............. *F16B 47/00* (2013.01); *A47G 19/10* (2013.01); *A47G 29/093* (2013.01); *F16M 13/005* (2013.01)

(58) Field of Classification Search
CPC .... F16B 47/00; F16B 2200/00; B66C 1/0212; F16M 13/022
USPC ...... 248/467, 683, 537, 205.5, 205.8, 206.2, 248/206.3, 309.3, 362, 363
See application file for complete search history.

(56) References Cited

U.S. PATENT DOCUMENTS

| 4,852,926 A * | 8/1989 | Littell .................. B66C 1/0287 248/363 |
| 5,381,990 A * | 1/1995 | Belokin .................. F16B 47/00 248/205.9 |
| 7,635,111 B2 * | 12/2009 | Hara ..................... F16B 47/00 248/205.5 |

(Continued)

FOREIGN PATENT DOCUMENTS

| CN | 103527610 A | 1/2014 |
| CN | 203685831 U | 7/2014 |

(Continued)

OTHER PUBLICATIONS

Office Action dated Dec. 24, 2021 in Chinese Application No. 202011149483.3.

*Primary Examiner* — Muhammad Ijaz
(74) *Attorney, Agent, or Firm* — Rabin & Berdo, P.C.

(57) ABSTRACT

A rotary closed-valve vacuum suction device is mounted to a bottom of an object, and has a valve assembly, a sucker, and a valve part. The valve assembly has a top valve seat and a bottom valve seat mounted below the top valve seat. The sucker is mounted to a bottom of the valve assembly. The valve part is inserted through a valve hole of the sucker and the bottom valve seat, and is connected to the top valve seat. When one of the top valve seat and the bottom valve seat is rotated to change the relative position between the bottom valve seat and the top valve seat in a height direction of the valve assembly, the valve part switches the valve hole of the sucker between an open state and a closed state.

11 Claims, 12 Drawing Sheets

(56) References Cited

U.S. PATENT DOCUMENTS

| | | | | |
|---|---|---|---|---|
| 7,708,245 | B2 * | 5/2010 | Woo | G09F 7/12 |
| | | | | 248/205.7 |
| 8,757,418 | B2 * | 6/2014 | Zimmerman | A47G 29/093 |
| | | | | 248/205.8 |
| 9,950,432 | B1 * | 4/2018 | Huang | B25J 15/0616 |
| 2009/0121102 | A1 * | 5/2009 | Woo | G09F 7/12 |
| | | | | 248/205.7 |
| 2013/0320164 | A1 * | 12/2013 | Pyon | F16B 47/00 |
| | | | | 248/206.3 |
| 2016/0238060 | A1 * | 8/2016 | Woo | F16B 47/003 |
| 2019/0063488 | A1 * | 2/2019 | Becker | F16B 47/00 |
| 2021/0145195 | A1 * | 5/2021 | Hakim | A47G 19/2261 |

FOREIGN PATENT DOCUMENTS

| | | |
|---|---|---|
| CN | 203756713 U | 8/2014 |
| CN | 105864268 A | 8/2016 |
| RU | 2637973 C1 | 12/2017 |
| TW | M484025 U | 8/2014 |

\* cited by examiner

ROTARY CLOSED-VALVE VACUUM SUCTION DEVICE

BACKGROUND OF THE INVENTION

1. Field of the Invention

The present invention relates to a vacuum suction device, and more particularly to a rotary closed-valve vacuum suction device that is configured to be mounted to a bottom of an object, such as a bowl, a dish, and a hanging member, for fixing the object on a table or a wall.

2. Description of Related Art

When a container such as a bowl and a dish is placed on a tabletop, the container may be knocked down easily due to an external force colliding with the container, or the container may slip on the tabletop due to a tilt of the tabletop. For solving the danger that the container is prone to fall or slip after the container is placed on the tabletop, a conventional sucker is mounted on a bottom of the container and can suck the tabletop for fixing the container on the tabletop.

However, in use, the conventional sucker is mounted on the bottom of the container and sucks the tabletop to generate an adequate suction force between the conventional sucker and the tabletop. Although the container can be fixed on the tabletop, it is relatively difficult for users to move the container from the tabletop. Therefore, the conventional sucker is inconvenient in use.

In addition, the conventional sucker is also adapted to a hanging object such as a hanger and a hook for fixing the hanging object on a wall. After the conventional sucker sucks the wall, a suction force generated between the conventional sucker and the wall is sufficient. Thus, it is relatively difficult for the users to move the hanging object from the wall. As a result, it is difficult to change the position of the hanging object on the wall, and the conventional sucker is still inconvenient in use.

To overcome the shortcomings, the present invention provides a rotary closed-valve vacuum suction device to mitigate or obviate the aforementioned problems.

SUMMARY OF THE INVENTION

The objective of the invention is to provide a rotary closed-valve vacuum suction device that can solve the drawback that the conventional sucker is inconvenient in use.

The rotary closed-valve vacuum suction device is mounted on a bottom of an object, and has a valve assembly, a sucker, and a valve part.

The valve assembly has a height direction, a central axis, a top valve seat, a bottom valve seat, and a ventilation path. The central axis extends along the height direction. The bottom valve is mounted below the top valve seat. The ventilation path is formed between the top valve seat and the bottom valve seat. The ventilation path communicates with an exterior environment of the valve assembly. One of the top valve seat and the bottom valve seat is laterally rotatable with respect to the central axis for changing a relative position between the bottom valve seat and the top valve seat in the height direction.

The sucker is mounted on a bottom of the valve assembly and has a valve hole. The valve hole is formed through the sucker, is located at a center of the sucker, and communicates with the ventilation path of the valve assembly.

The valve part is inserted through the valve hole of the sucker and the bottom valve seat, and is connected to the top valve seat. When one of the top valve seat and the bottom valve seat is rotated to change the relative position between the bottom valve seat and the top valve seat in the height direction, the valve part switches the valve hole of the sucker between an open state and a closed state.

The rotary closed-valve vacuum suction device can be mounted on the bottom of the object, such as a container and a hanging member. When the object is placed on a tabletop or is fixed on a wall, a user can rotate the object to drive the top valve seat or the bottom valve seat to rotate for changing a relative position between the bottom valve seat and the top valve seat in the height direction. Then, the valve part switches the valve hole of the sucker between the open state and the closed state. When the valve hole of the sucker is closed relative to the valve part, the sucker can airtightly and fixedly suck the tabletop or the wall, so that the object is fixed on the tabletop or the wall and is not prone to sliding. When the valve hole of the sucker is open relative to the valve part, a space between the sucker and the tabletop communicates with the exterior environment of the valve assembly via the valve hole of the sucker and the ventilation path of the valve assembly to form a non-airtight state. Air in the exterior environment of the valve assembly can flow between the sucker and the tabletop or the sucker and the wall, and the object can move away from the tabletop or the wall. It is easy to switch the valve hole of the sucker between the open state and the closed state by rotating. Convenience of using the rotary closed-valve vacuum suction device is increased.

Other objectives, advantages and novel features of the invention will become more apparent from the following detailed description when taken in conjunction with the accompanying drawings.

DETAILED DESCRIPTION OF THE PREFERRED EMBODIMENT

A rotary closed-valve vacuum suction device in accordance with the present invention is configured to be mounted to an object, such as a container, which is placed on a tabletop, and a hanging member, which is laterally fixed on a wall. For conciseness in description, the following is that the rotary closed-valve vacuum suction device is applied to the container as an example, but it is not limited to this.

Figure 1:
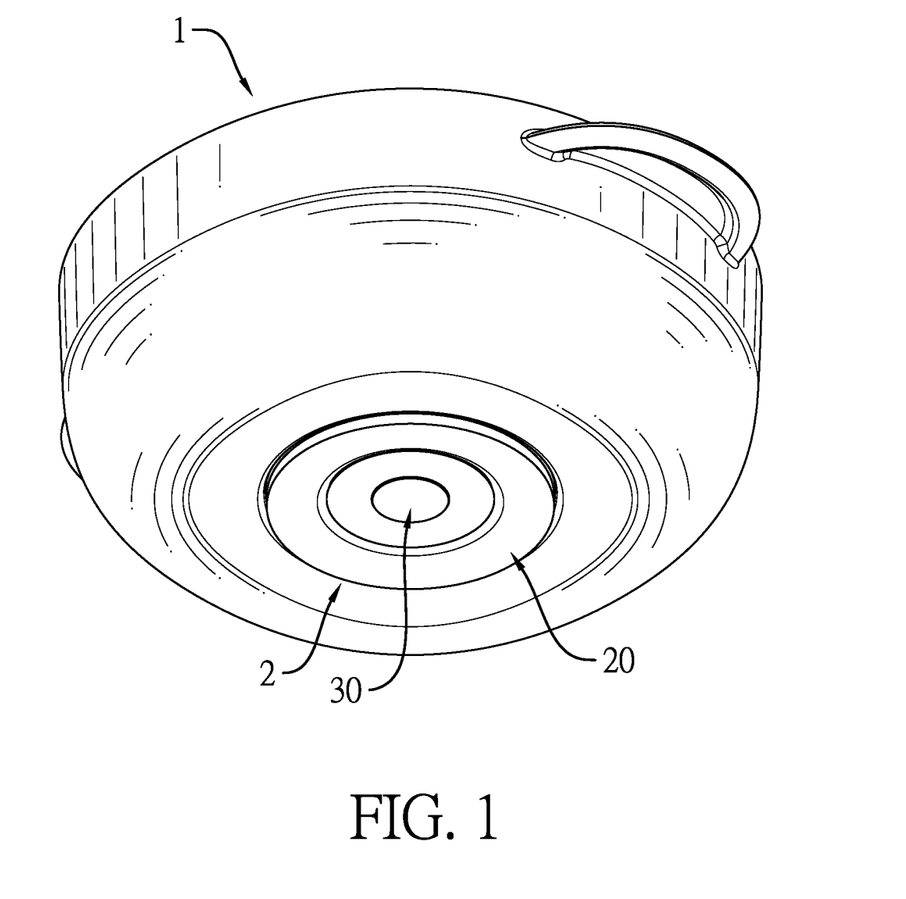
FIG. 1 is a perspective view of a first embodiment of a rotary closed-valve vacuum suction device in accordance with the present invention, showing the rotary closed-valve vacuum suction device is mounted on a bottom of an object.

With reference to FIG. 1, in a first embodiment, the rotary closed-valve vacuum suction device 2 is applied to a bottom of the object 1, such as a bowl, a dish, a cup or the like. With reference to FIGS. 1-2 and 8-9, in the first embodiment and a second embodiment, the rotary closed-valve vacuum suction device 2 has a valve assembly 10, a sucker 20, and a valve part 30.

With reference to FIGS. 2-4 and 9-11, the valve assembly 10 is mounted on the bottom of the object 1. The valve assembly 10 has a height direction and a central axis 101. The central axis 101 extends along the height direction. According to usage of the object 1 in FIG. 1, the height direction is a vertical direction. When the rotary closed-valve vacuum suction device 2 is applied to the hanging member, the rotary closed-valve vacuum suction device 2 can laterally suck the wall with the hanging member. Thus, the height direction is a horizontal direction. The bottom of the container is deemed as a back of a rear end of the hanging member. The valve assembly 10 is mounted on the back of the object. In order to easily describe combination relationships and combination directions in the rotary closed-valve vacuum suction device, the following description takes the height direction as the vertical direction.

With reference to FIGS. 2-4 and 9-11, the valve assembly 10 has a top valve seat 11 and a bottom valve seat 12 mounted below the top valve seat 11. One of the top valve seat 11 and the bottom valve seat 12 is rotated obversely or reversely within a predetermined angle range with respect to the central axis 101. A relative position in the height direction between the bottom valve seat 12 and the top valve seat 11 is changed. The top valve seat 11 and the bottom valve seat 12 can move relative to each other. A ventilation path 115 is formed between the top valve seat 11 and the bottom valve seat 12, and the ventilation path 115 communicates with an exterior environment of the valve assembly 10.

With reference to FIGS. 2-4 and 9-11, based on the above description, the bottom valve seat 12 and the top valve 11 can be rotated relative to each other for changing the relative position between the bottom valve seat 12 and the top valve seat 11 in the height direction. The top valve seat 11 has multiple abutting rods 113. The abutting rods 113 are mounted on a bottom of the top valve seat 11 and are located symmetrically around the central axis 101 of the valve assembly 10 at spaced intervals. The bottom valve seat 12 is moveably mounted below the top valve seat 11 and has multiple lifting rails 123. The lifting rails 123 are mounted on a top surface of the bottom valve seat 12, are located symmetrically around the central axis 101 of the valve assembly 10 at spaced intervals, and are respectively matched with the abutting rods 113 in amount and position. In each one of the lifting rails 123, the lifting rail 123 has a low position end 1231, a high position end 1232, and an inclined plane 1233. The low position end 1231 and the high position end 1232 are respectively formed on two ends of the lifting rail and are opposite to each other. A distance between the high position end 1232 and a bottom surface of the bottom valve seat 12 is larger than a distance between the low position end 1231 and the bottom surface of the bottom valve seat 12. The inclined plane 1233 is formed on the lifting rail 123 between the low position end 1231 and the high position end 1232. Furthermore, the lifting rail 123 has a flange 1234. The flange 1234 is formed on a side, which is adjacent to the inclined plane 1233, of the high position end 1232. When the bottom valve seat 12 and the top valve seat 11 are rotated relative to each other, the abutting rods 113 of the top valve seat 11 can be respectively slid along the inclined planes 123 of the lifting rails 123 to change the relative position between the bottom valve seat 12 and the top valve seat 11 in the height direction. In addition, when the abutting rods 113 are located at the high position ends 1232 of the lifting rails 123, the abutting rods 113 are limited by the flanges 1234 of the lifting rails 123.

Figure 2:
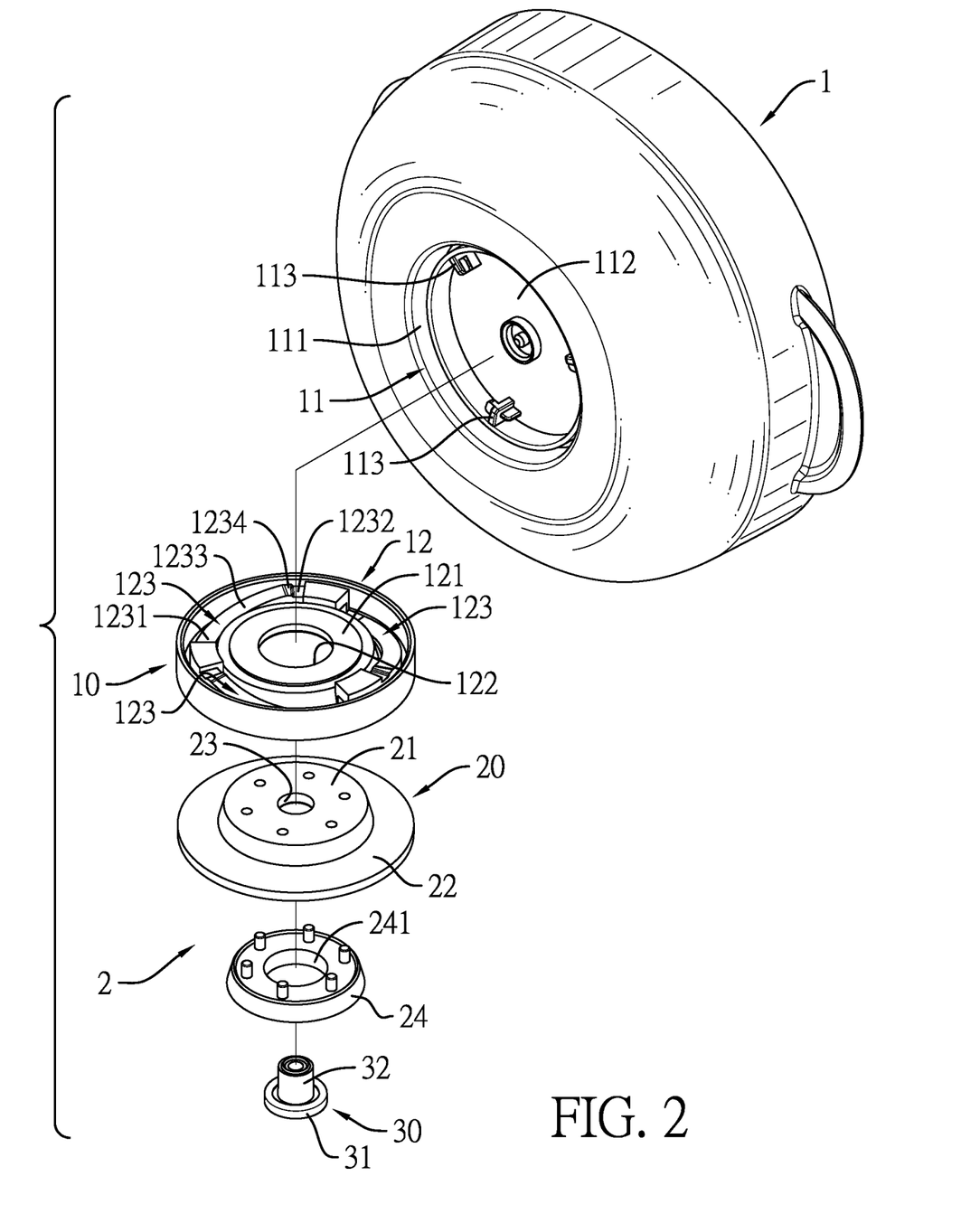
FIG. 2 is an exploded perspective view of the rotary closed-valve vacuum suction device in FIG. 1.
Figure 3:
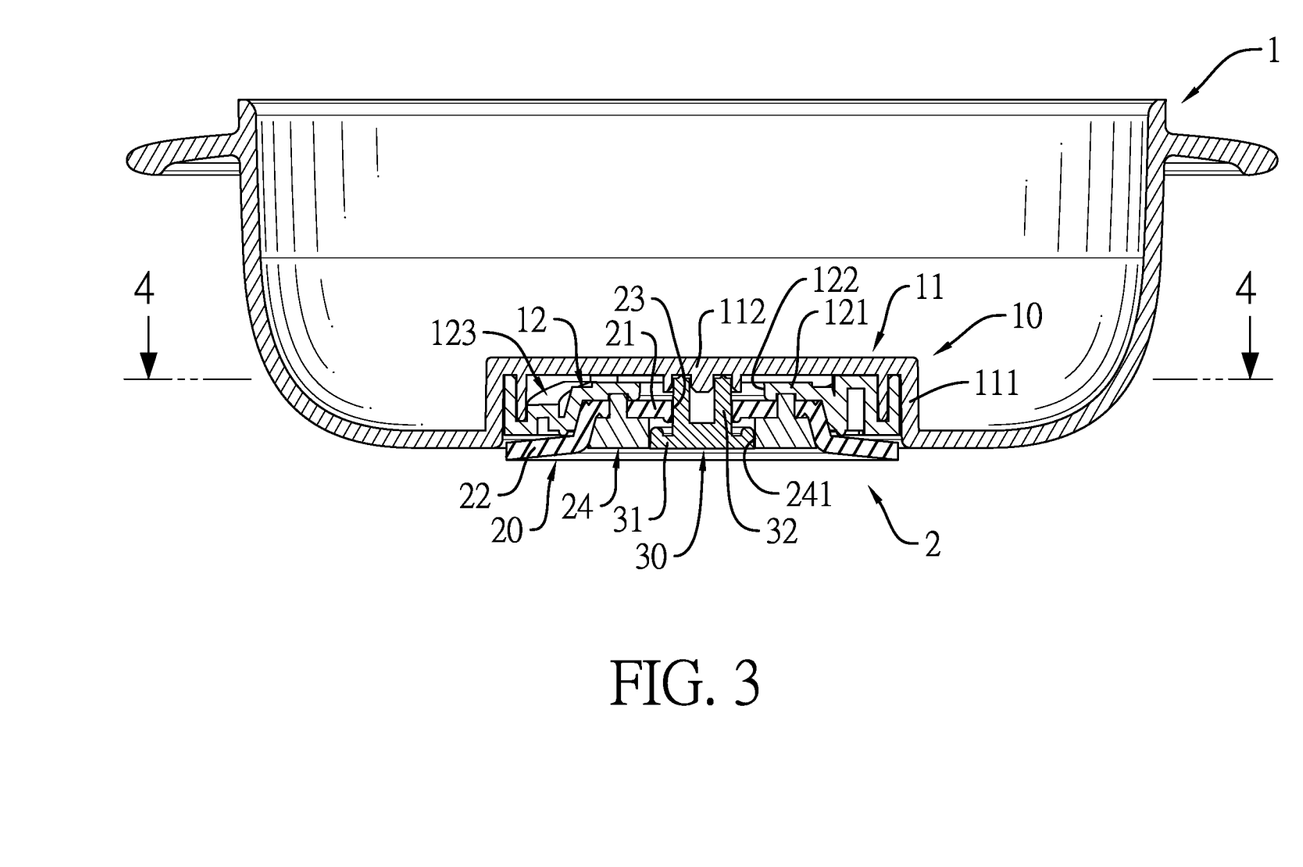
FIG. 3 is a cross sectional side view of the rotary closed-valve vacuum suction device in FIG. 1.
Figure 4:
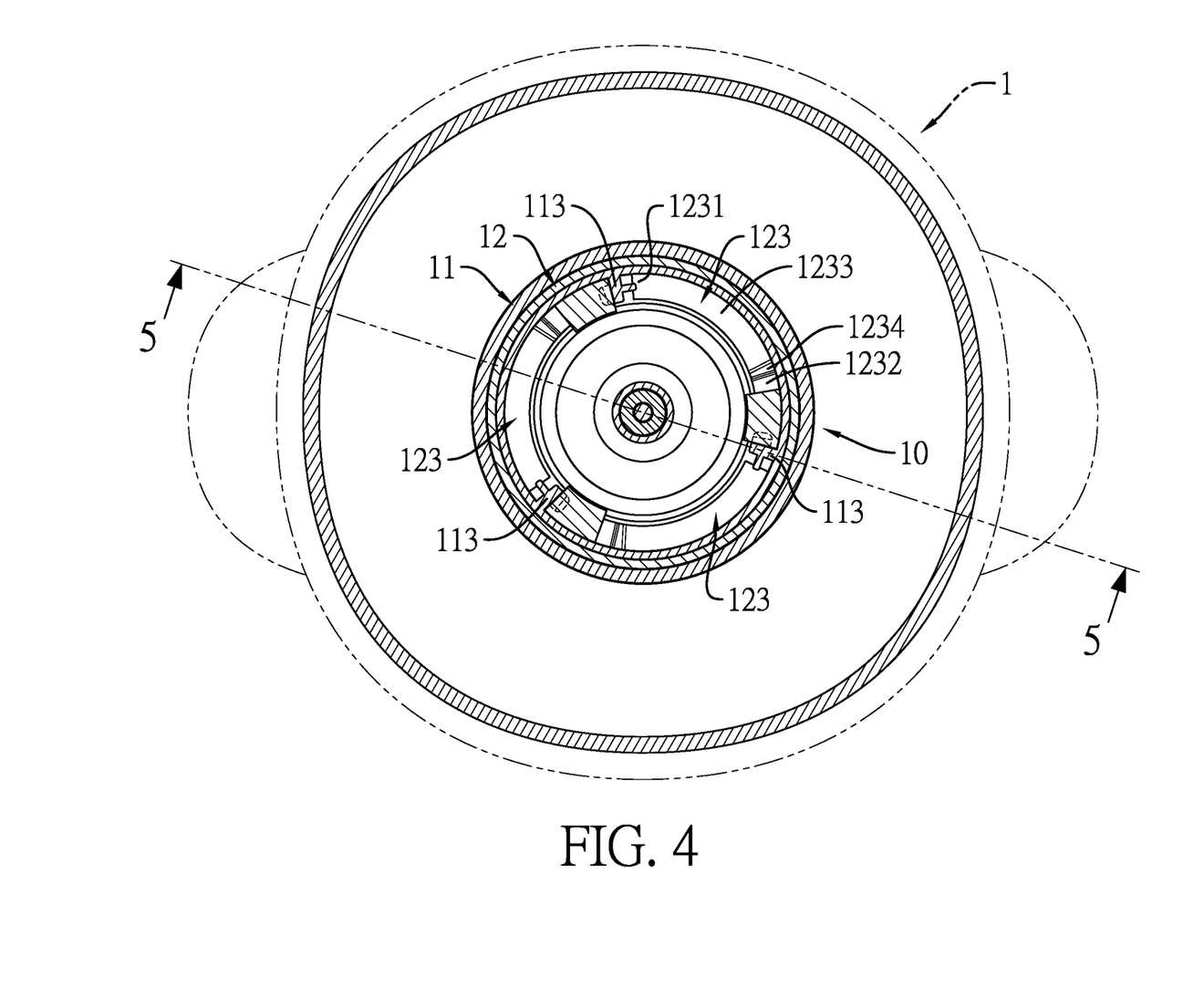
FIG. 4 is a cross sectional top side view of the rotary closed-valve vacuum suction device along line 4-4 in FIG. 3.
Figure 5:
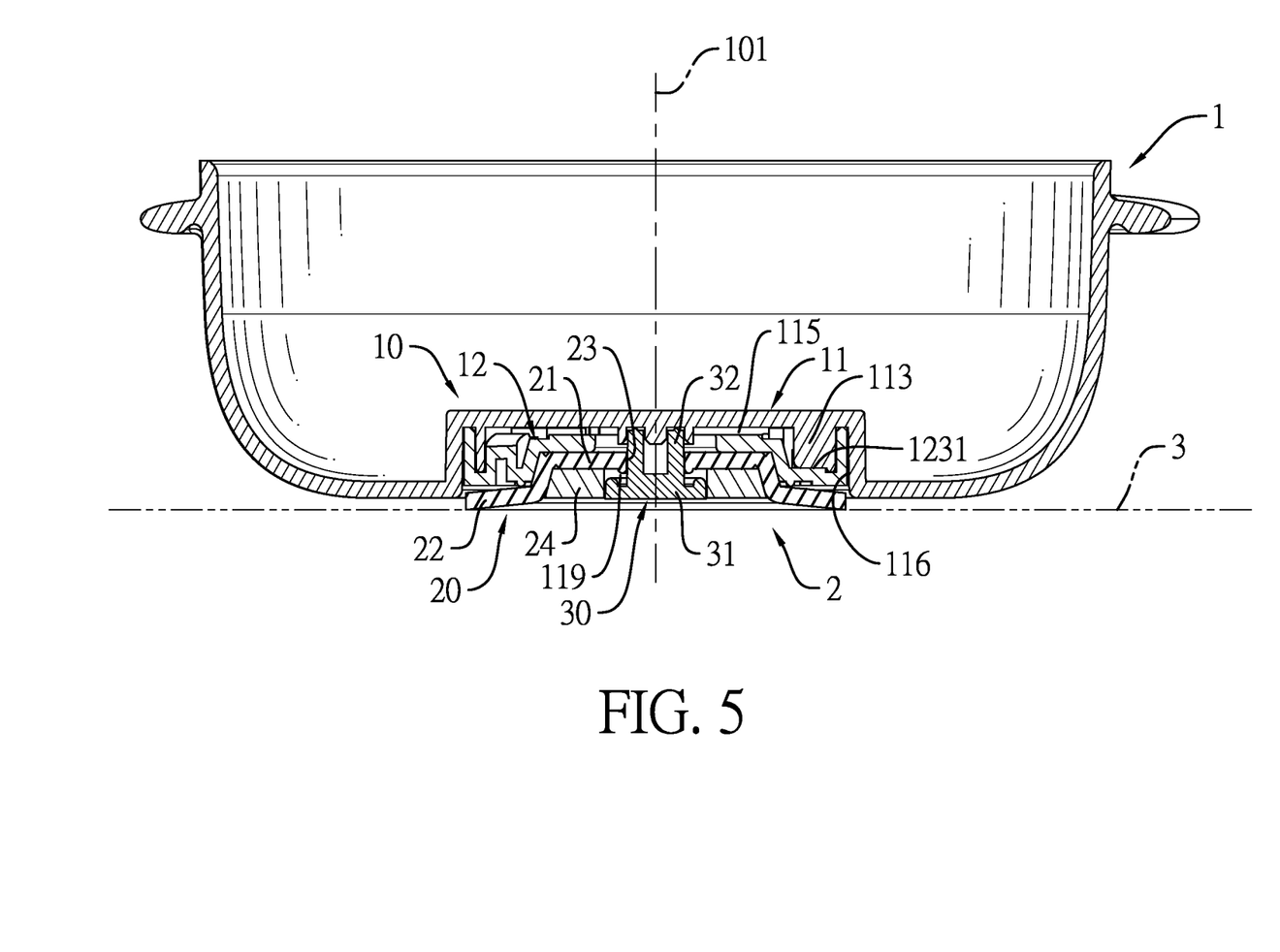
FIG. 5 is a cross sectional side view of the rotary closed-valve vacuum suction device along line 5-5 in FIG. 4, showing a valve part is not airtight relative to a sucker.
Figure 6:
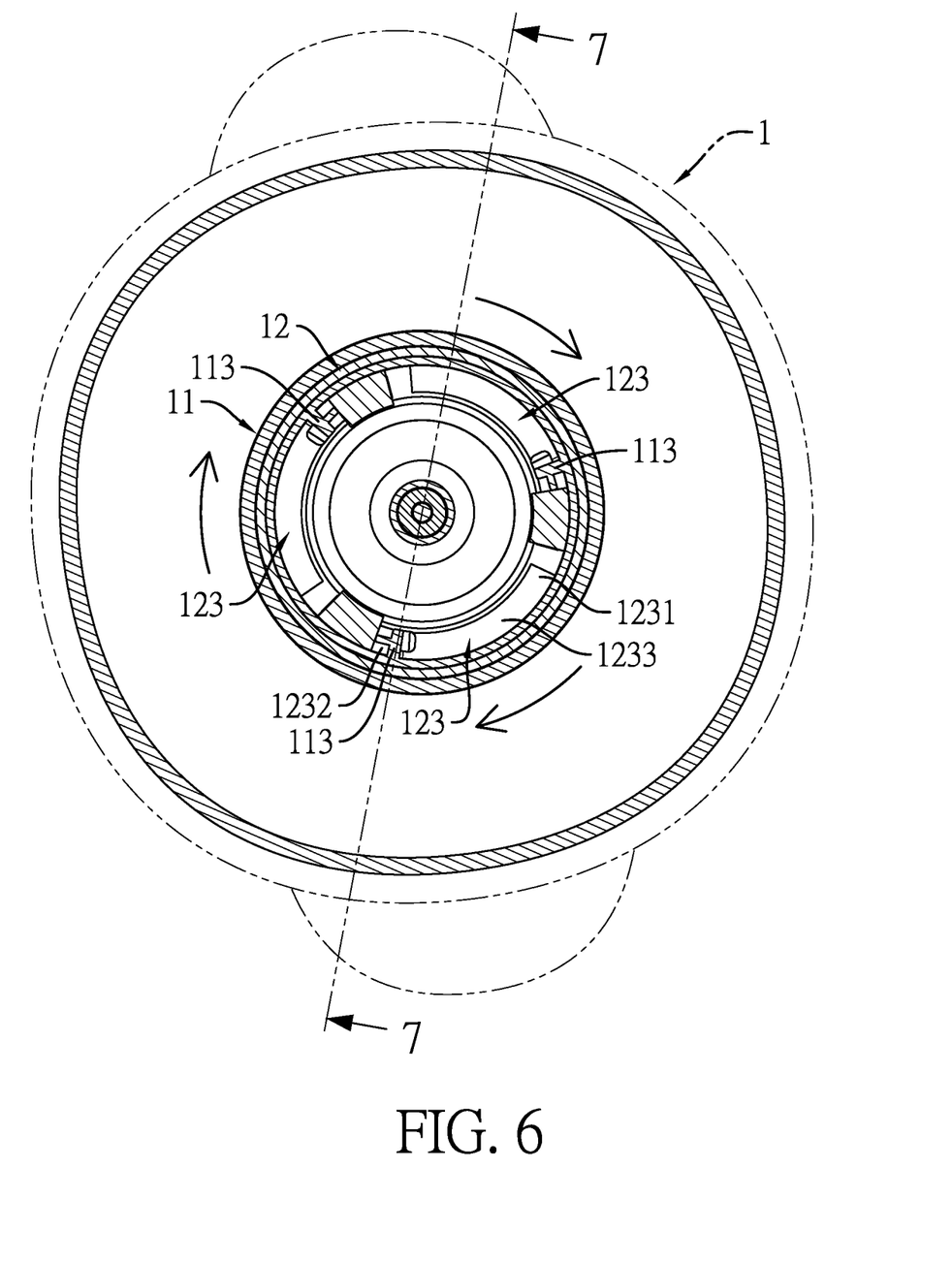
FIG. 6 is a cross sectional top side view of the rotary closed-valve vacuum suction device in FIGS. 1 to 3, showing the object is rotated for an angle and the valve part is airtight relative to the sucker.
Figure 7:
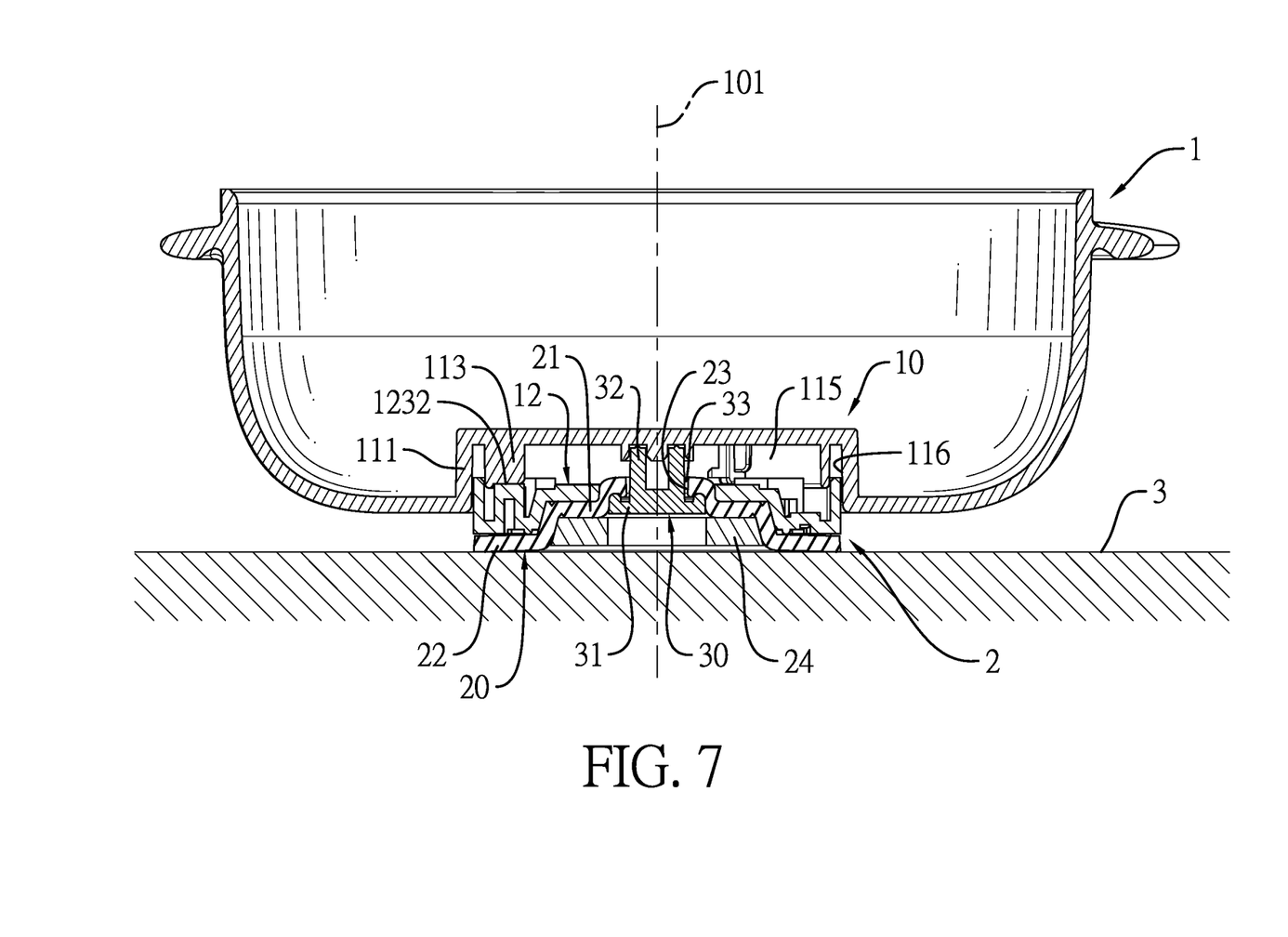
FIG. 7 is a cross sectional side view of the rotary closed-valve vacuum suction device along line 7-7 in FIG. 6, showing the valve part is airtight relative to the sucker.
Figure 8:
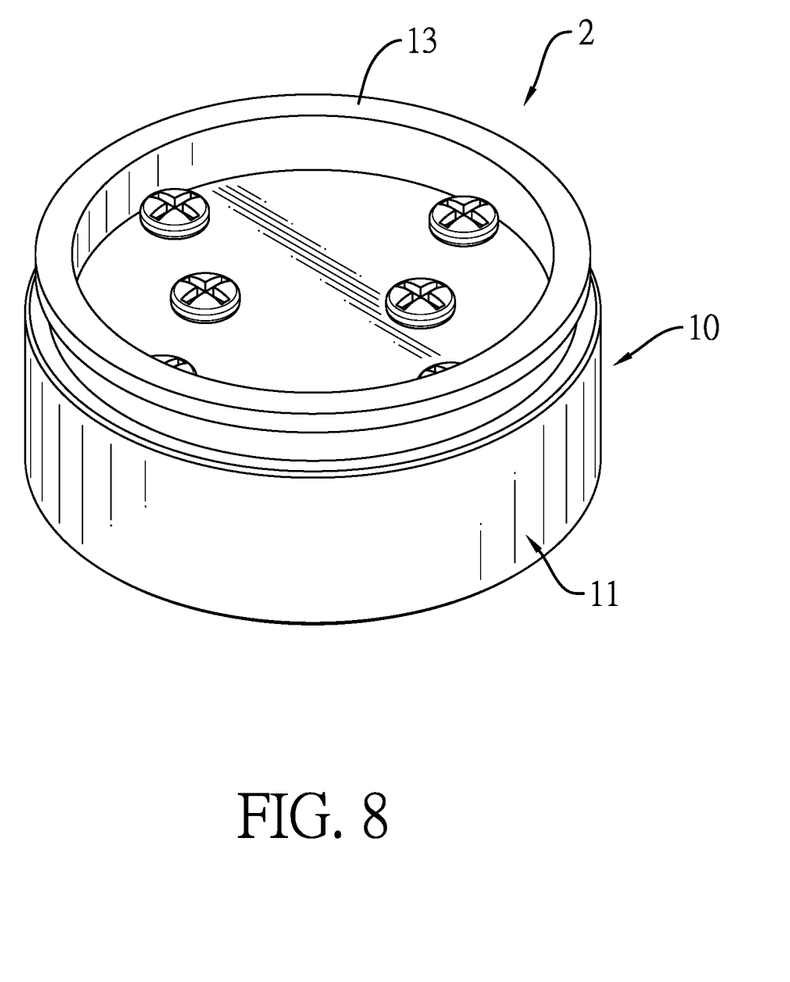
FIG. 8 is a perspective view of a second embodiment of a rotary closed-valve vacuum suction device in accordance with the present invention.

With reference to FIGS. 2 to 4, in the first embodiment, the top valve seat 11 of the valve assembly 10 is integrally formed on the bottom of the object 1. In addition, the top valve seat 11 may be an independent element and is fixedly mounted on the bottom of the object 1 by adhesion via adhesive such as silica gel. The top valve seat 11 has a chamber 116, a surrounding wall 111, and a top plate 112. The chamber 116 of the top valve seat 11 is formed on a bottom surface of the top valve seat 11. The surrounding wall 111 is formed on the top valve seat 11 and is located around the chamber 116 of the top valve seat 11. The top plate 112 is formed on the top valve seat 11 and is located above the chamber 116 of the top valve seat 11. The abutting rods 113 are mounted on a bottom surface of the top plate 112. The bottom valve seat 12 is moveably mounted in the chamber of the top valve seat 11 and has a bottom plate 121. The bottom plate 121 is formed on the bottom valve seat 12 and has a through hole 122 formed through a center of the bottom plate 121. The lifting rails 123 are mounted on a top surface of the bottom plate 121. The abutting rods 113 of the top valve seat 11 contact and are slidable along the lifting rails 123 respectively. When the object 1 is rotated, the top valve seat 11 and the bottom valve seat 12 are rotated relative to each other, and the abutting rods 113 co-operate with the lifting rails 123 to change the relative position between the bottom valve seat 12 and the top valve seat 11.

Figure 9:
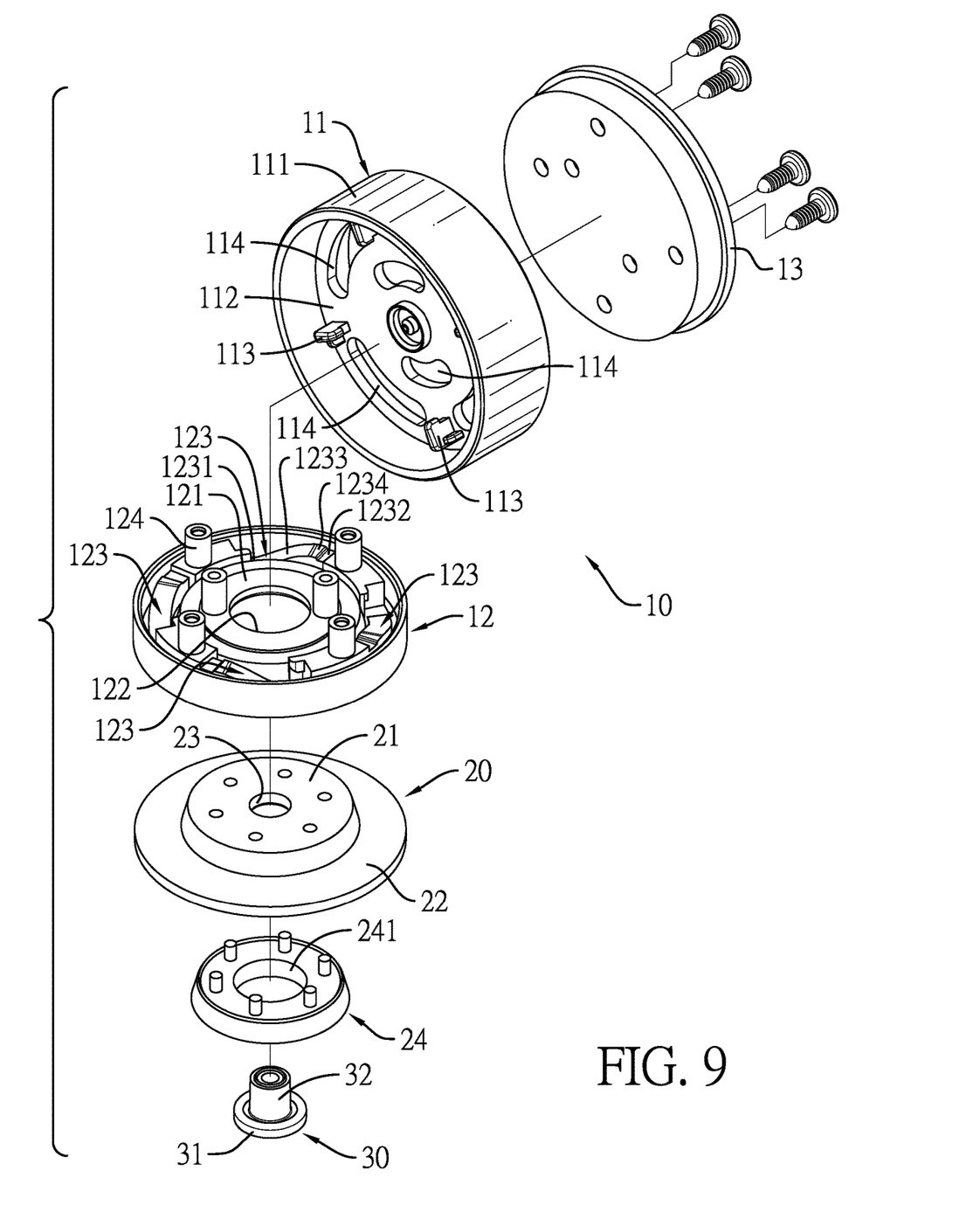
FIG. 9 is an exploded perspective view of the rotary closed-valve vacuum suction device in FIG. 8.
Figure 10:
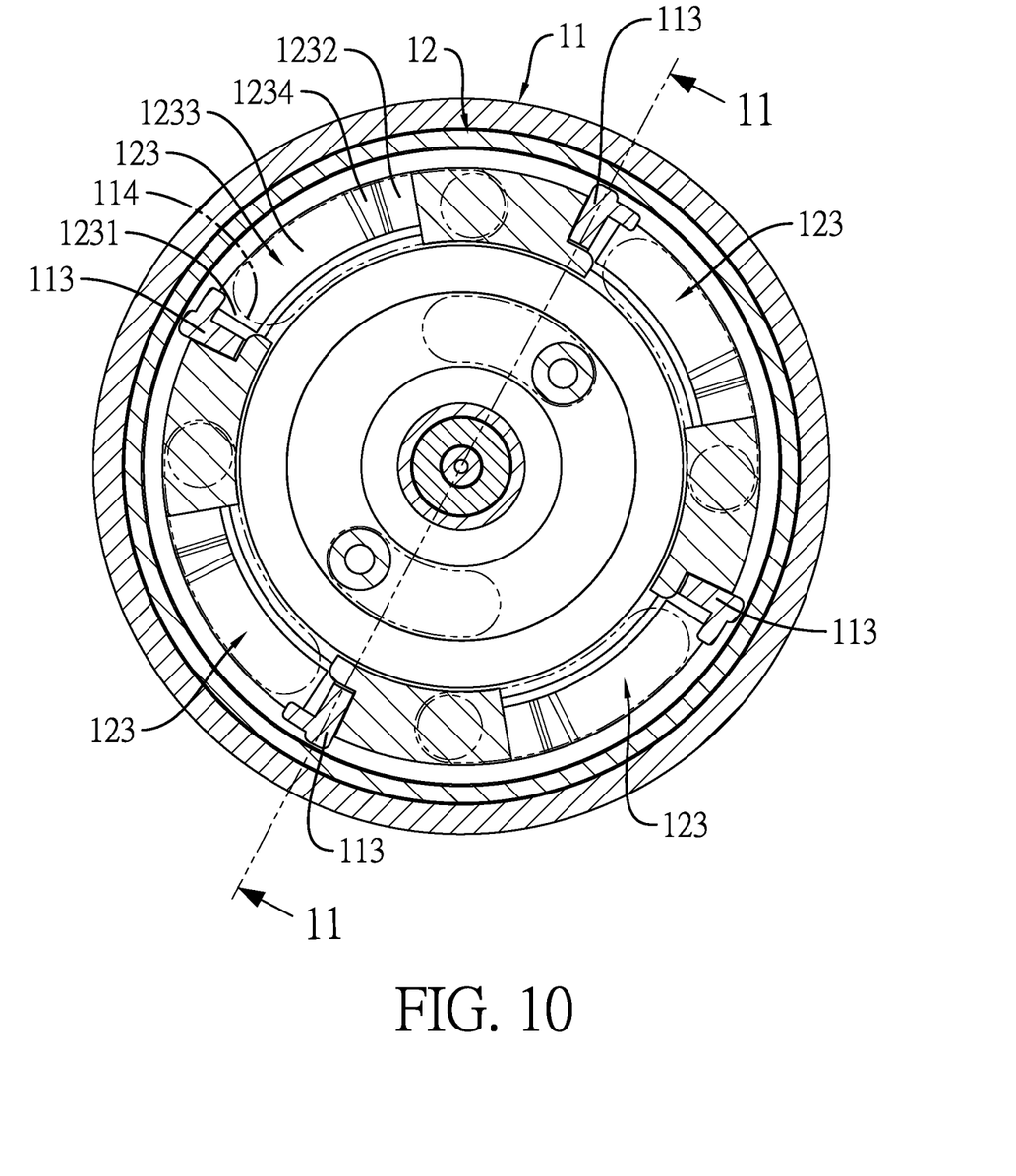
FIG. 10 is a cross sectional top side view of the rotary closed-valve vacuum suction device in FIGS. 8 and 9.
Figure 11:
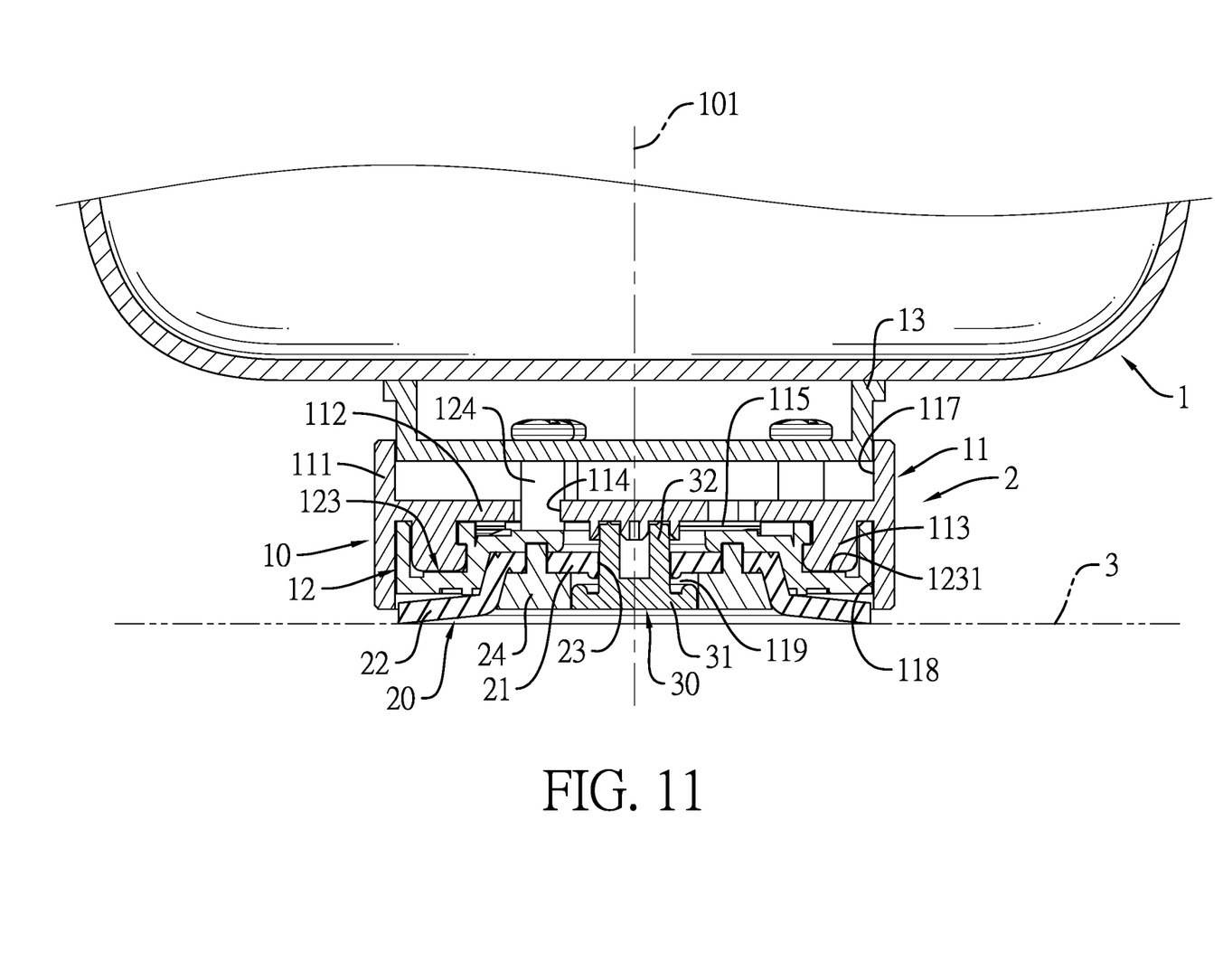
FIG. 11 is a cross sectional side view of the rotary closed-valve vacuum suction device along line 11-11 in FIG. 10, showing the rotary closed-valve vacuum suction device is mounted on the bottom of the object, and the valve part is not airtight.
Figure 12:
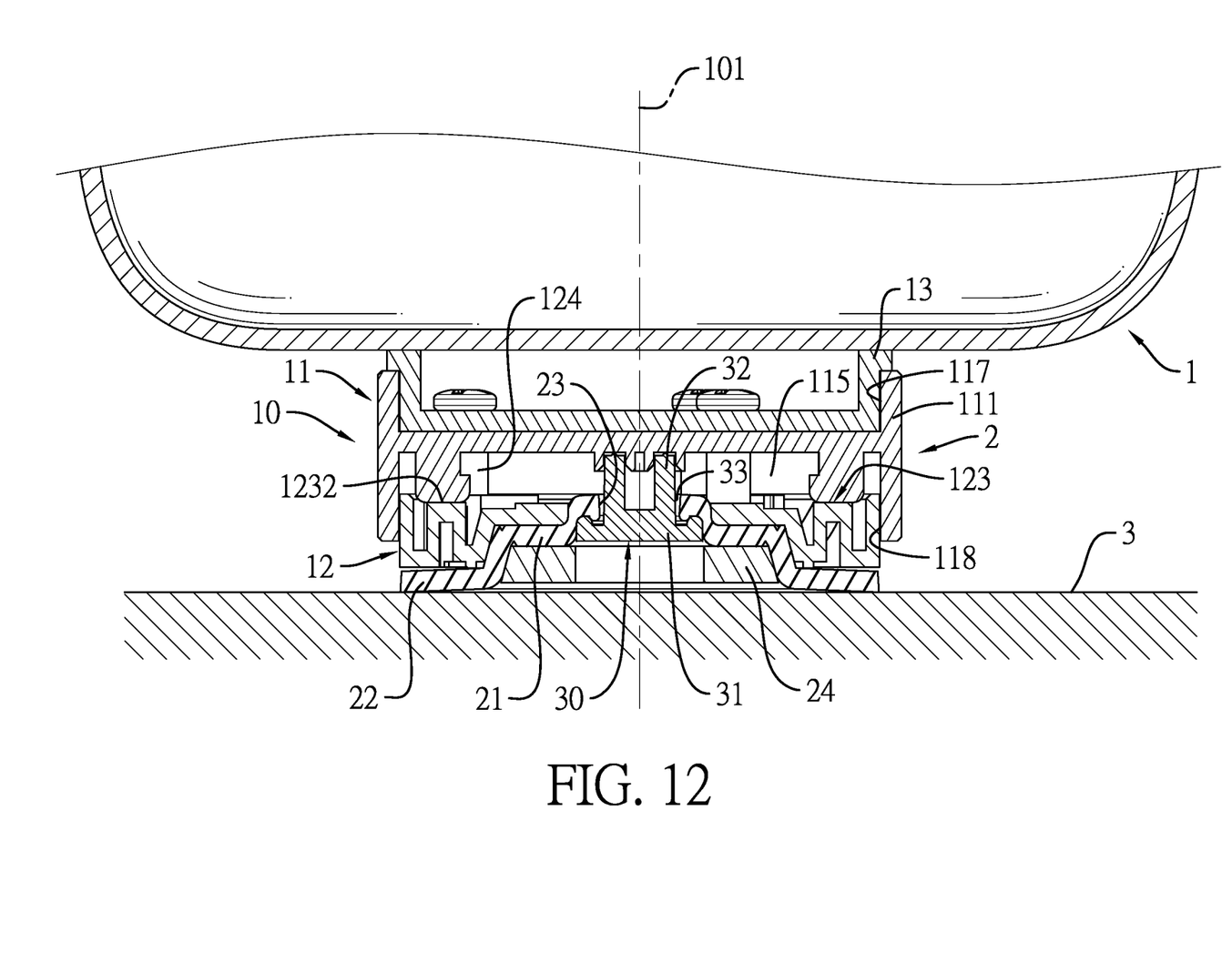
FIG. 12 is a cross sectional top side view of the rotary closed-valve vacuum suction device in FIG. 11, showing the object is rotated for the said angle and the valve part is airtight.

With reference to FIGS. 9 to 11, in the second embodiment, the top valve seat 11 of the valve assembly 10 has a surrounding wall 111 formed in the top valve seat 11, a top plate 112 located in the surrounding wall 111, a top chamber 117, and a bottom chamber 118. The top chamber 117 and the bottom chamber 118 are enclosed by the surrounding wall 111 and are respectively located at a top surface and a bottom surface of the top plate 112. The top plate 112 has multiple curved elongated holes 114 located symmetrically around the central axis 101 of the valve assembly 10 at spaced intervals. The abutting rods 113 are mounted on the bottom surface of the top plate 112. The valve assembly 10 has a connecting element 13. The connecting element 13 is moveably mounted in the top chamber 117 of the top valve seat 11 and is applied to be fixedly connected to the bottom of the object 1 by adhesion via adhesive such as silica gel. The bottom valve seat 12 is moveably mounted in the bottom chamber 118 of the top valve seat 11 and has a bottom plate. The bottom plate 121 is formed on the bottom valve seat 12 and has a through hole 122 formed through a center of the bottom plate 121. The lifting rails 123 are mounted on a top surface of the bottom plate 121. The abutting rods 113 of the top valve seat 11 contact and are slidable along the lifting rails 123 respectively. The bottom valve seat 12 has multiple connecting rods 124. The connecting rods 124 are mounted on the top surface of the bottom plate 121, are respectively inserted into the curved elongated holes 114 of the top plate 111, and are all screwed into or fixedly connected to the connecting element 13. When the object 1 is rotated, the bottom valve seat 12 is connected to the object 1 through the connecting element 13, and the bottom valve seat 12 is driven by the object 1 to rotate relative to the top valve seat 11. The abutting rods 113 co-operate with the lifting rails 123 to change the relative position between the bottom valve seat 12 and the top valve seat 11. Furthermore, movements of the connecting rods 124 are limited by the curved elongated holes 114 for limiting a relative rotating angle range between the bottom valve seat 12 and the top valve seat 11.

With reference to FIGS. 2-4 and 9-11, the sucker 20 is mounted on a bottom of the valve assembly 10 and has a valve hole 23. The valve hole 23 is formed through the sucker 20, is located at a center of the sucker 20, and communicates with the ventilation path 115 of the valve assembly 10. The sucker 20 has a base 21, a conical disk 22 formed around the base 21, and a fixer 24. The valve hole 23 is formed through a center of the base 21. The sucker 20 is fixedly connected to the bottom surface of the bottom valve seat 12 through the base 21 or the fixer 24, which is inserted through the base 21 from a bottom of the base 21 and fixedly connected to the bottom surface of the bottom valve 12. The fixer 24 is located around the valve hole 23 and has an inner hole 122. The inner hole 122 is formed through the fixer 24 and communicates with the valve hole 23. A diameter of the inner hole 122 is larger than a diameter of the valve hole 23.

With reference to FIGS. 2-4 and 9-11, the valve part 30 is inserted through the valve hole 23 of the sucker 20 and the bottom valve seat 12, and is connected to the top valve seat 11. When one of the top valve seat 11 and the bottom valve seat 12 is rotated to change the relative position between the bottom valve seat 12 and the top valve seat 11 in the height direction, the valve part 30 switches the valve hole 23 of the sucker 20 between an open state and a closed state. The valve part 30 has an airtight pad 31 and a valve rod 32. The airtight pad 31 is located out of the valve hole 23 of the sucker 20. The valve rod 32 is mounted on a top center of the airtight pad 31, is inserted through the valve hole 23 and the through hole 122 of the bottom valve seat 12, and is fixedly connected to the bottom surface of the top valve seat 11. The valve part 30 has an air gap 33 formed between the valve rod 32 and a hole wall, which is located around the valve hole 23 of the base 21. When one of the top valve seat 11 and the bottom valve seat 12 is rotated to change the relative position between the bottom valve seat 12 and the top valve seat 11 in the height direction, the airtight pad 31 of the valve part 30 switches the valve hole 23 of the sucker 20 between the open state and the closed state. When the airtight pad 31 is located below the base 21 of the sucker 20 to form a ventilation spacing 119, air can flow through the ventilation spacing 119 and the air gap 33 between the valve rod 32 and the hole wall, and then air can flow into the ventilation path 115 communicating with the exterior environment of the valve assembly 10.

In the first embodiment of the rotary closed-valve vacuum suction device 2, the rotary closed-valve vacuum suction device 2 is mounted on a bottom of the container. With reference to FIGS. 2 to 7, when the object 1 is placed on the tabletop 3 and a user wants to fix the object 1 on the tabletop 3, the user can rotate the object 1 to be obversely rotated for an angle, and the top valve seat 11 and the valve part 30 driven by the object 1 are rotated relative to the bottom valve seat 12. The abutting rods 113 of the top valve seat 11 are guided by the lifting rails 123 of the bottom valve seat 12. Each one of the abutting rods 113 is slid from the low position end 1231 to the high position end 1232 to press the bottom valve seat 12, so that the valve hole 23 of the sucker 20 is closed by the airtight pad 31 of the valve part 30, which is connected to the top valve seat 11. The conical disk 22 of the sucker 20 is airtightly connected to the tabletop 3. Gravity of the object 1 is applied to the sucker 20. An airtight space between the sucker 20 and the tabletop 3 is in a vacuum-like negative pressure state. The object 1 is fixed on the tabletop 3 through the rotary closed-valve vacuum suction device 2 and will not easily slip.

If the user wants to move the object 1 on the tabletop 3, the user can reversely rotate the object 1 for driving the top valve seat 11 and the valve part 30 to reversely rotate relative to the bottom valve seat 12. Each one of the abutting rods 113 of the top valve seat 11 is slid to the low position end 1231 along a corresponding one of the lifting rails 123 of the bottom valve seat 12, so that the airtight pad 31 of the valve part 30 moves away from the valve hole 23 of the sucker 20 to open the valve hole 23 of the sucker 20 and the airtight space between the conical disk 22 of the sucker 20 and the tabletop 3. The ventilation path 115 of the valve assembly 10 communicates with the exterior environment of the valve assembly 10. The vacuum-like negative pressure state between the sucker 20 and the tabletop 3 is released, so that the user can move the object 1 on the tabletop 3.

In the second embodiment, the rotary closed-valve vacuum suction device 2 is mounted on a bottom of the object 1. With reference to FIGS. 9 to 12, when the object 1 is placed on the tabletop 3 and a user wants to fix the object 1 on the tabletop 3, the user can rotate the object 1 to be obversely rotated for an angle, and the bottom valve seat 12 is rotated relative to the top valve seat 11 through the object 1 and the connecting portion 13. The abutting rods 113 of the top valve seat 11 are guided by the lifting rails 123 of the bottom valve seat 12. Each one of the abutting rods 113 is slid from the low position end 1231 to the high position end 1232 to upwardly push the bottom valve seat 12, so that the valve hole 23 of the sucker 20 is closed by the airtight pad 31 of the valve part 30, which is connected to the top valve seat 11. The conical disk 22 of the sucker 20 is airtightly connected to the tabletop 3. The gravity of the object 1 is applied to the sucker 20. The airtight space between the sucker 20 and the tabletop 3 is in the vacuum-like negative pressure state. The object 1 is fixed on the tabletop 3 through the rotary closed-valve vacuum suction device 2 and will not easily slip.

If the user wants to move the object 1 on the tabletop 3, the user can reversely rotate the object 1 for driving the bottom valve seat 12 through the connecting element 13 to reversely rotate relative to the top valve seat 11. Each one of the abutting rods 113 of the top valve seat 11 is slid to the low position end 1231 along the corresponding lifting rail 123 of the bottom valve seat 12, so that the valve part 30 connected to the top valve seat 11 is moved downwardly.

The airtight pad 31 of the valve part 30 moves away from the valve hole 23 of the sucker 20 to open the valve hole 23 of the sucker 20 and the airtight space between the conical disk 22 of the sucker 20 and the tabletop 3. The ventilation path 115 of the valve assembly 10 communicates with the exterior environment of the valve assembly 10. The vacuum-like negative pressure state between the sucker 20 and the tabletop 3 is released, so that the user can move the object 1 on the tabletop 3.

As mentioned above, the rotary closed-valve vacuum suction device can be mounted on the back of the hanging member, which is deemed as the bottom of the object 1. The rotary closed-valve vacuum suction device 2 and the hanging member are laterally mounted on the wall, and the rotary closed-valve vacuum suction device 2 can be steadily fixed onto the wall by the suction force due to a rotation movement of the hanging member. A suction effect of the rotary closed-valve vacuum suction device on the wall can be removed by a reverse rotation movement of the hanging member. An operation method of the rotary closed-valve vacuum suction device is the same as the above-mentioned preferred embodiment, and will not be repeated.

Accordingly, after the rotary closed-valve vacuum suction device 2 is mounted on the bottom (or a back) of the object 1, the object 1 is placed on the tabletop 3 or is laterally placed on the wall, and the user can rotate the object 1 to drive the top valve seat 11 of the bottom valve seat 12 to rotate. A relative position between the bottom valve seat 12 and the top valve seat 11 in the height direction of the valve assembly 10 is changed to switch a closed state or an open state of the valve part 30 relative to the valve hole 23 of the sucker 20. In the closed state of the valve part 30 relative to the valve hole 23 of the sucker 20, the sucker 20 can airtightly adhere to the tabletop 3 or the wall by the suction force, and the object 1 can be fixed on the tabletop 3 or the wall and will not easily slip. In the open state of the valve part 30 relative to the valve hole 23 of the sucker 20, the airtight space between the sucker 20 and the tabletop 3 communicate with the exterior environment of the valve assembly 10 via the valve hole 23 of the sucker 20 and the ventilation path 115 of the valve assembly 10, and is in a non-airtight state. Air in the exterior environment of the valve assembly 10 can flow between the sucker 20 and the tabletop 3 or between the sucker 20 and the wall, so that the object 1 can be moved away from the tabletop 3 or the wall. It is easy to switch the valve hole 23 of the sucker 20 between the open state and the closed state by rotating. Convenience of using the rotary closed-valve vacuum suction device is increased.

What is claimed is:

1. A rotary closed-valve vacuum suction device configured to be mounted on a bottom of an object, and comprising:
    a valve assembly having
        a height direction;
        a central axis extending along the height direction;
        a top valve seat;
        a bottom valve seat mounted below the top valve seat;
        a ventilation path formed between the top valve seat and the bottom valve seat, wherein the ventilation path communicates with an exterior environment of the valve assembly; and
        wherein one of the top valve seat and the bottom valve seat is laterally rotatable with respect to the central axis for changing a relative position between the bottom valve seat and the top valve seat in the height direction;
    a sucker mounted on a bottom of the valve assembly and having
        a valve hole formed through the sucker, located at a center of the sucker, and communicating with the ventilation path of the valve assembly; and
    a valve part inserted through the valve hole of the sucker and the bottom valve seat, and connected to the top valve seat, wherein when one of the top valve seat and the bottom valve seat is rotated to change the relative position between the bottom valve seat and the top valve seat in the height direction, the valve part switches the valve hole of the sucker between an open state and a closed state.

2. The rotary closed-valve vacuum suction device as claimed in claim 1, wherein
    the top valve seat has
        multiple abutting rods mounted on a bottom of the top valve seat and located symmetrically around the central axis of the valve assembly;
    the bottom valve seat is moveably mounted below the top valve seat and has
        multiple lifting rails mounted on a top surface of the bottom valve seat, located symmetrically around the central axis of the valve assembly at spaced intervals, and respectively matched with the abutting rods in amount and position, each one of the lifting rails having
            a low position end formed on the lifting rail;
            a high position end formed on the lifting rail opposite to the low position end, wherein a distance between the high position end and a bottom surface of the bottom valve seat is larger than a distance between the low position end and the bottom surface of the bottom valve seat; and
            an inclined plane formed on the lifting rail between the low position end and the high position end;
    wherein when the bottom valve seat and the top valve seat are rotated relatively, the abutting rods of the top valve seat are respectively slid along the inclined planes of the lifting rails to change the relative position between the bottom valve seat and the top valve seat in the height direction.

3. The rotary closed-valve vacuum suction device as claimed in claim 2, wherein in each one of the lifting rails, the lifting rail has a flange, the flange is formed on a side, which is adjacent to the inclined plane, of the high position end; the flange limits a position of a respective one of the abutting rods when the respective one of the abutting rods is located on the high position end of the lifting rail.

4. The rotary closed-valve vacuum suction device as claimed in claim 3, wherein
    the top valve seat is applied to be mounted on the bottom of the object and has
        a chamber formed on a bottom surface of the top valve seat;
        a surrounding wall formed on the top valve seat and located around the chamber of the top valve seat;
        a top plate formed on the top valve seat and located above the chamber of the top valve seat; the abutting rods mounted on a bottom surface of the top plate; and
    the bottom valve seat is moveably mounted in the chamber of the top valve seat and has
        a bottom plate having
            a through hole formed through a center of the bottom plate;

wherein the lifting rails are mounted on a top surface of the bottom plate.

5. The rotary closed-valve vacuum suction device as claimed in claim 4, wherein the sucker has
  a base; the valve hole is formed through a center of the base;
  a conical disk formed around the base;
  a fixer inserted through the base from a bottom of the base, fixedly connected to the bottom surface of the bottom valve seat, and having
    an inner hole formed through the fixer and communicating with the valve hole; a diameter of the inner hole being larger than a diameter of the valve hole; and
the valve part has
  an airtight pad located out of the valve hole of the sucker;
  a valve rod mounted on a top center of the airtight pad, inserted through the valve hole and the through hole of the bottom valve seat, and fixedly connected to the bottom surface of the top valve seat;
  an air gap formed between the valve rod and an inner wall of the valve hole of the base; wherein when one of the top valve seat and the bottom valve seat is rotated to change the relative position between the bottom valve seat and the top valve seat in the height direction, the airtight pad of the valve part switches the valve hole of the sucker between the open state and the closed state.

6. The rotary closed-valve vacuum suction device as claimed in claim 3, wherein the top valve seat has a surrounding wall formed in the top valve seat, a top plate located in the surrounding wall, a top chamber, and a bottom chamber;
the top chamber and the bottom chamber are enclosed by the surrounding wall and are respectively located at a top surface and a bottom surface of the top plate;
the top plate has multiple curved elongated holes located symmetrically around the central axis of the valve assembly at spaced intervals; the abutting rods are mounted on the bottom surface of the top plate;
the valve assembly has a connecting element, and the connecting element is moveably mounted in the top chamber of the top valve seat and is applied to be connected to the bottom of the object;
the bottom valve seat is moveably mounted in the bottom chamber of the top valve seat and has a bottom plate; the bottom plate is formed on the bottom valve seat and has a through hole formed through a center of the bottom plate;
the lifting rails are mounted on a top surface of the bottom plate; the abutting rods of the top valve seat contact and are slidable along the lifting rails respectively;
the bottom valve seat has multiple connecting rods, the connecting rods are mounted on the top surface of the bottom plate, are respectively inserted into the curved elongated holes of the top plate, and are all fixedly connected to the connecting element.

7. The rotary closed-valve vacuum suction device as claimed in claim 6, wherein the sucker has
  a base; the valve hole formed through a center of the base;
  a conical disk formed around the base;
  a fixer inserted through the base from a bottom of the base, fixedly connected to the bottom surface of the bottom valve seat, and having
    an inner hole formed through the fixer and communicating with the valve hole; a diameter of the inner hole being larger than a diameter of the valve hole; and
the valve part has
  an airtight pad located out of the valve hole of the sucker;
  a valve rod mounted on a top center of the airtight pad, inserted through the valve hole and the through hole of the bottom valve seat, and fixedly connected to the bottom surface of the top valve seat;
  an air gap formed between the valve rod and an inner wall of the valve hole of the base; wherein when one of the top valve seat and the bottom valve seat is rotated to change the relative position between the bottom valve seat and the top valve seat in the height direction, the airtight pad of the valve part switches the valve hole of the sucker between the open state and the closed state.

8. The rotary closed-valve vacuum suction device as claimed in claim 2, wherein the top valve seat is applied to be mounted on the bottom of the object and has
  a chamber formed on a bottom surface of the top valve seat;
  a surrounding wall formed on the top valve seat and located around the chamber of the top valve seat;
  a top plate formed on the top valve seat and located above the chamber of the top valve seat; the abutting rods mounted on a bottom surface of the top plate; and
the bottom valve seat is moveably mounted in the chamber of the top valve seat and has
  a bottom plate having
    a through hole formed through a center of the bottom plate;
wherein the lifting rails are mounted on a top surface of the bottom plate.

9. The rotary closed-valve vacuum suction device as claimed in claim 8, wherein the sucker has
  a base; the valve hole is formed through a center of the base;
  a conical disk formed around the base;
  a fixer inserted through the base from a bottom of the base, fixedly connected to the bottom surface of the bottom valve seat, and having
    an inner hole formed through the fixer and communicating with the valve hole; a diameter of the inner hole being larger than a diameter of the valve hole; and
the valve part has
  an airtight pad located out of the valve hole of the sucker;
  a valve rod mounted on a top center of the airtight pad, inserted through the valve hole and the through hole of the bottom valve seat, and fixedly connected to the bottom surface of the top valve seat;
  an air gap formed between the valve rod and an inner wall of the valve hole of the base; wherein when one of the top valve seat and the bottom valve seat is rotated to change the relative position between the bottom valve seat and the top valve seat in the height direction, the airtight pad of the valve part switches the valve hole of the sucker between the open state and the closed state.

10. The rotary closed-valve vacuum suction device as claimed in claim 2, wherein
   the top valve seat has a surrounding wall formed in the top valve seat, a top plate located in the surrounding wall, a top chamber, and a bottom chamber;
   the top chamber and the bottom chamber are enclosed by the surrounding wall and are respectively located at a top surface and a bottom surface of the top plate;
   the top plate has multiple curved elongated holes located symmetrically around the central axis of the valve assembly at spaced intervals; the abutting rods are mounted on the bottom surface of the top plate;
   the valve assembly has a connecting element, and the connecting element is moveably mounted in the top chamber of the top valve seat and is applied to be connected to the bottom of the object;
   the bottom valve seat is moveably mounted in the bottom chamber of the top valve seat and has a bottom plate; the bottom plate is formed on the bottom valve seat and has a through hole formed through a center of the bottom plate;
   the lifting rails are mounted on a top surface of the bottom plate; the abutting rods of the top valve seat contact and are slidable along the lifting rails respectively;
   the bottom valve seat has multiple connecting rods, the connecting rods are mounted on the top surface of the bottom plate, are respectively inserted into the curved elongated holes of the top plate, and are all fixedly connected to the connecting element.

11. The rotary closed-valve vacuum suction device as claimed in claim 10, wherein
   the sucker has
      a base; the valve hole formed through a center of the base;
      a conical disk formed around the base;
      a fixer inserted through the base from a bottom of the base, fixedly connected to the bottom surface of the bottom valve seat, and having
         an inner hole formed through the fixer and communicating with the valve hole; a diameter of the inner hole being larger than a diameter of the valve hole; and
   the valve part has
      an airtight pad located out of the valve hole of the sucker;
      a valve rod mounted on a top center of the airtight pad, inserted through the valve hole and the through hole of the bottom valve seat, and fixedly connected to the bottom surface of the top valve seat;
   the valve part has
      an air gap formed between the valve rod and an inner wall of the valve hole of the base; wherein when one of the top valve seat and the bottom valve seat is rotated to change the relative position between the bottom valve seat and the top valve seat in the height direction, the airtight pad of the valve part switches the valve hole of the sucker between the open state and the closed state.

* * * * *